Figure 2:
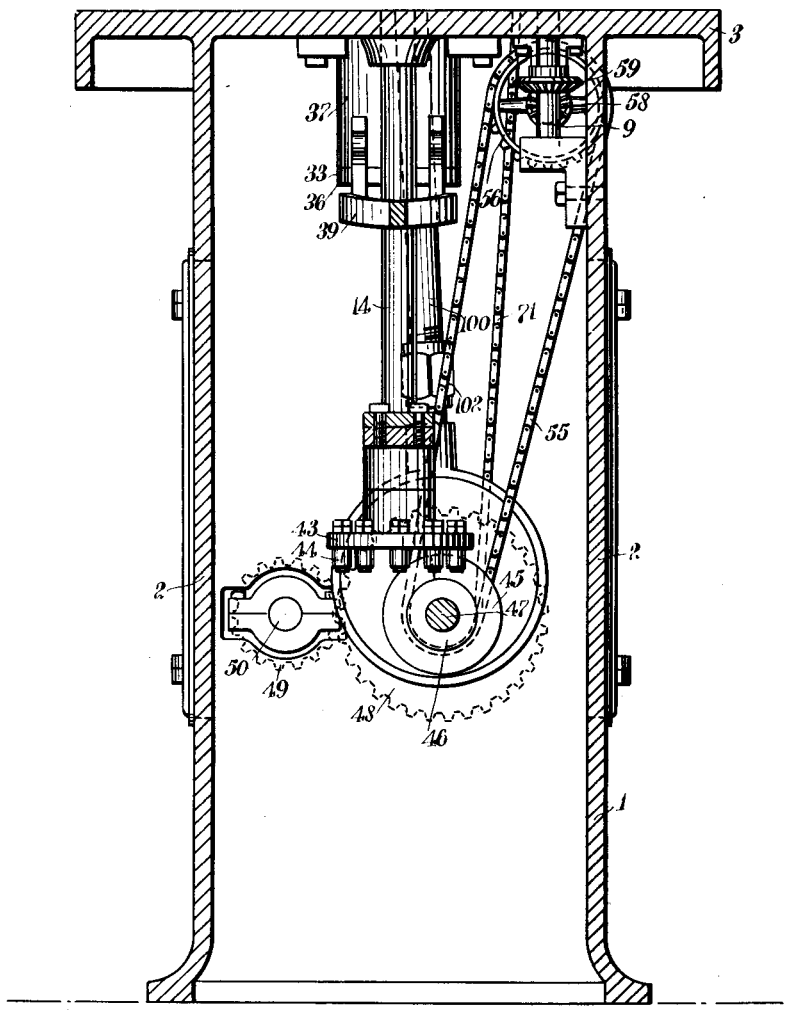

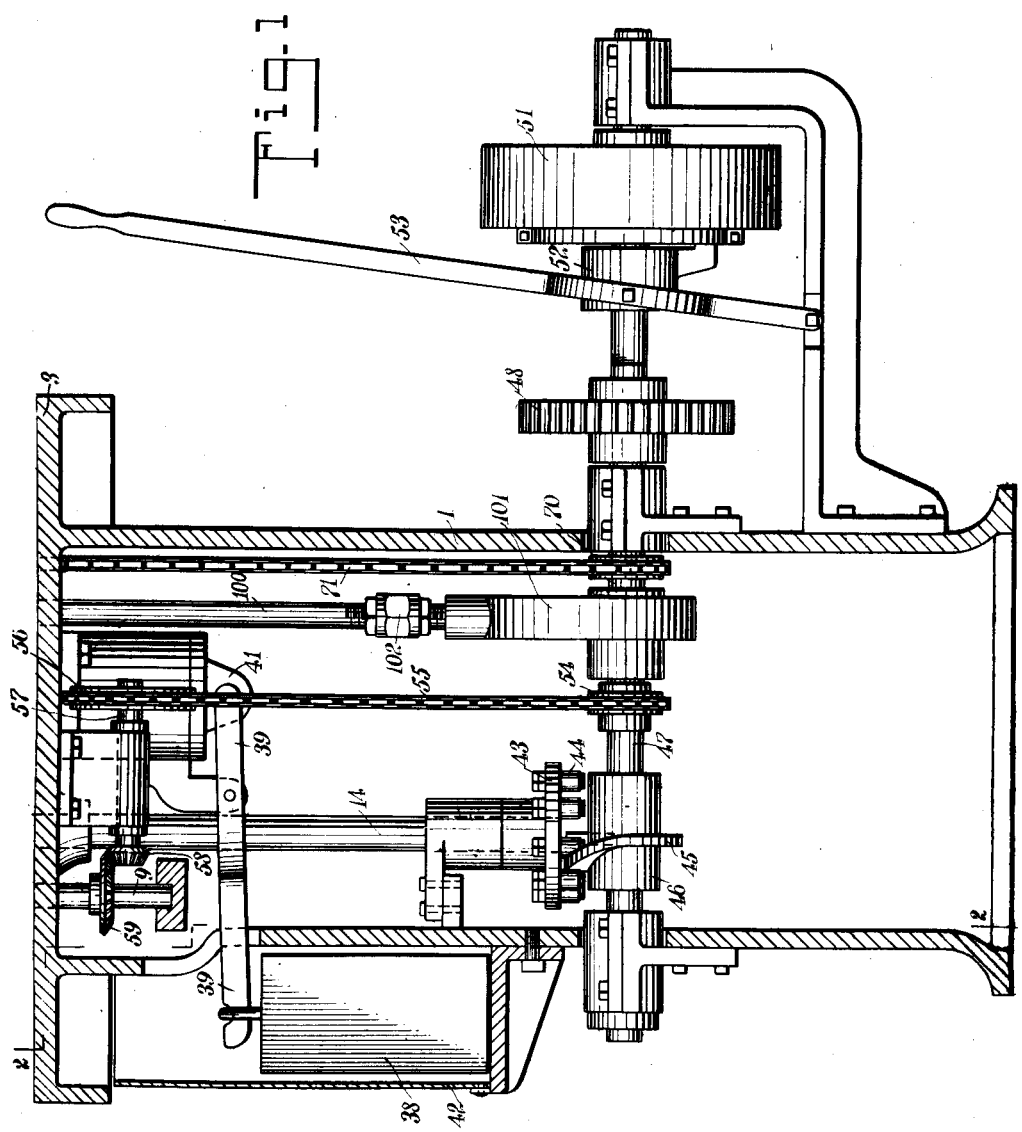

A. JOHNSON.
BOTTLE CAPPING MACHINE.
APPLICATION FILED MAR. 12, 1910.
1,106,222.
Patented Aug. 4, 1914.
10 SHEETS—SHEET 2.
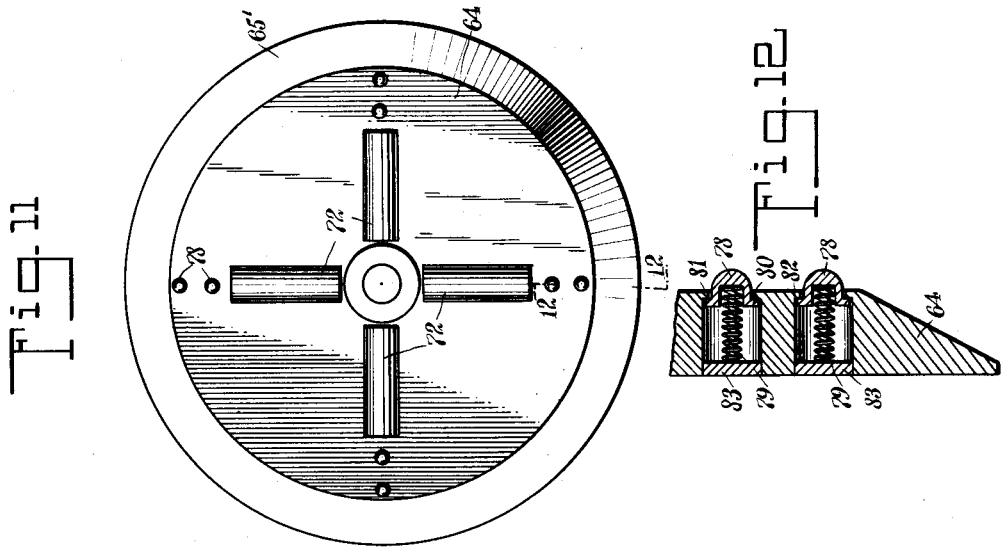
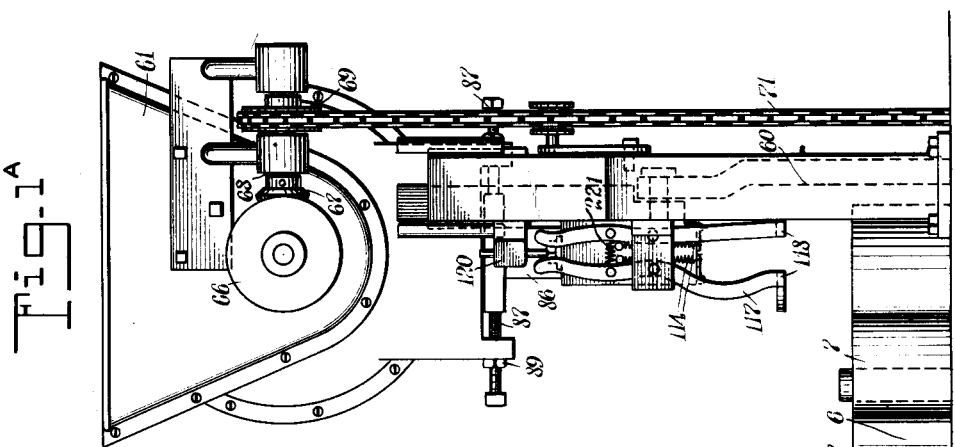
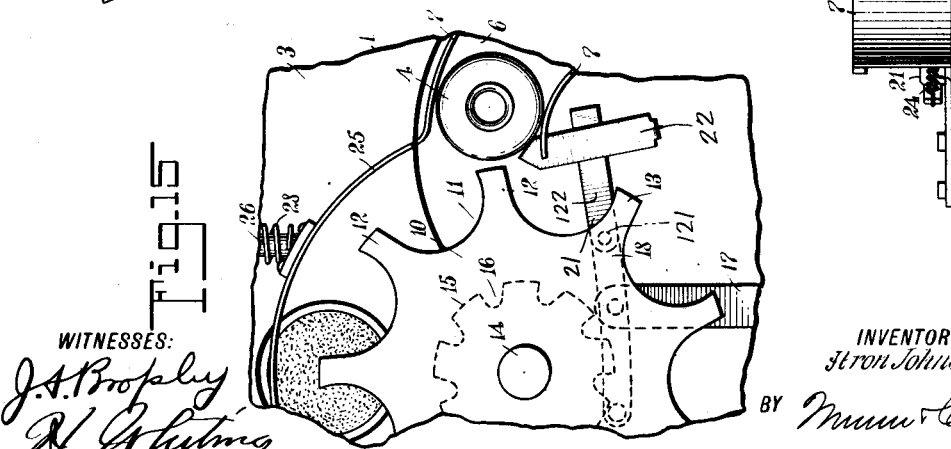
WITNESSES:
INVENTOR
Itron Johnson
BY
ATTORNEYS

A. JOHNSON.
BOTTLE CAPPING MACHINE.
APPLICATION FILED MAR. 12, 1910.

1,106,222.

Patented Aug. 4, 1914.
10 SHEETS—SHEET 3.

WITNESSES:
J. A. Brophy
H. Whiting

INVENTOR
Aron Johnson
BY Munn & Co.
ATTORNEYS

A. JOHNSON.
BOTTLE CAPPING MACHINE.
APPLICATION FILED MAR. 12, 1910.

1,106,222.
Patented Aug. 4, 1914.
10 SHEETS—SHEET 4.

WITNESSES:
J. A. Brophy
H. Whiting

INVENTOR
Aron Johnson
BY Munn & Co.
ATTORNEYS

A. JÓHNSON.
BOTTLE CAPPING MACHINE.
APPLICATION FILED MAR. 12, 1910.

1,106,222.

Patented Aug. 4, 1914.
10 SHEETS—SHEET 8.

WITNESSES:
J. A. Brophy
H. Whiting.

INVENTOR
Aron Johnson
BY Munn & Co.
ATTORNEYS

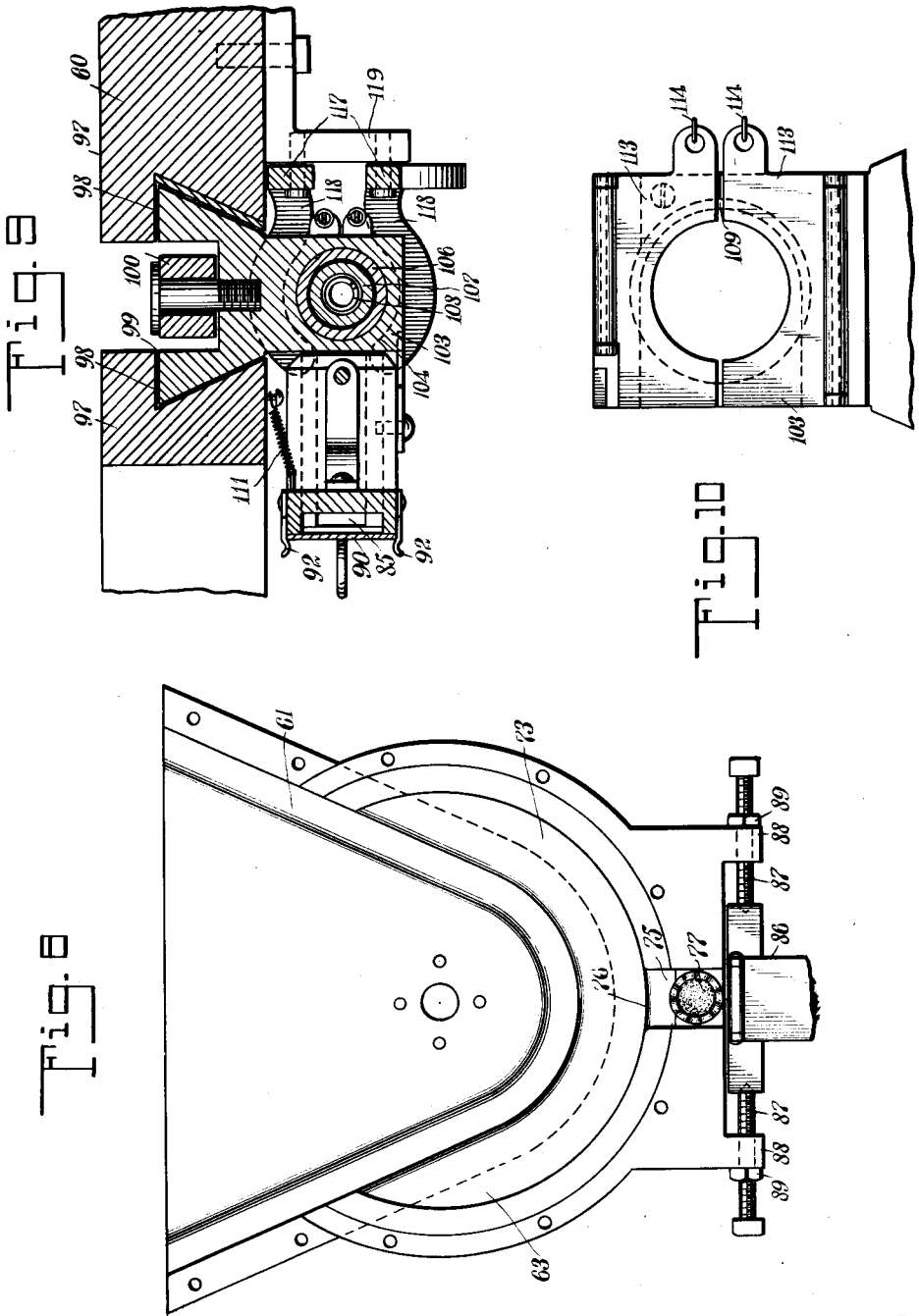

A. JOHNSON.
BOTTLE CAPPING MACHINE.
APPLICATION FILED MAR. 12, 1910.
1,106,222.
Patented Aug. 4, 1914.
10 SHEETS—SHEET 10.
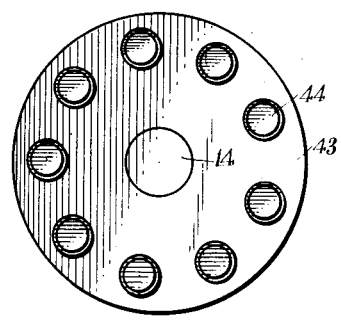
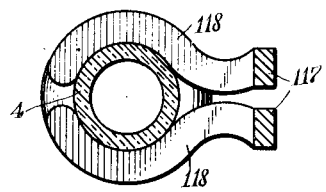
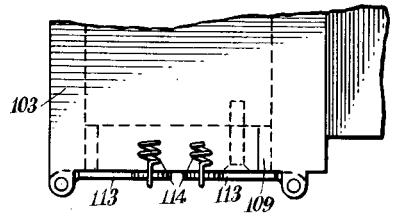
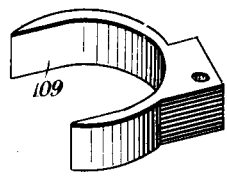
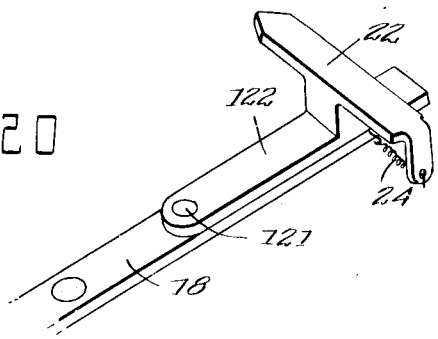
WITNESSES:
J. A. Brophy
R. Whiting
INVENTOR
Aron Johnson
BY
ATTORNEYS

UNITED STATES PATENT OFFICE.

ARON JOHNSON, OF NEW YORK, N. Y.

BOTTLE-CAPPING MACHINE.

1,106,222.     Specification of Letters Patent.     Patented Aug. 4, 1914.

Application filed March 12, 1910. Serial No. 548,767.

*To all whom it may concern:*

Be it known that I, ARON JOHNSON, a citizen of the United States, and a resident of the city of New York, borough of Brooklyn, in the county of Kings and State of New York, have invented a new and Improved Bottle-Capping Machine, of which the following is a full, clear, and exact description.

This invention relates to a new and improved machine for placing caps on bottles and clenching the same in position.

An object of this invention is to provide a device which will be simple in construction, inexpensive to manufacture, strong, durable, and accurate, quick and positive in its operation.

Another object of this invention is to provide a feeding device for feeding the caps to the capping mechanism, which will positively reject such caps as have entered the feeding passage in the wrong position, and thereby feed the caps in their proper position to the capping mechanism.

A further object of this invention is to provide means for supporting the bottle while being capped, including a compensating mechanism, to allow for irregularities in the operation, and also to allow for various heights of bottles.

A further object of this invention is to provide proper means for holding the bottles in juxtaposition to the capping mechanism, with means for feeding a single cap to the capping mechanism at a time.

A still further object of this invention is to provide a bottle-feeding mechanism with means for regulating the supply of bottles thereto, and with means for allowing for bottles of different diameters and thicknesses.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 13:
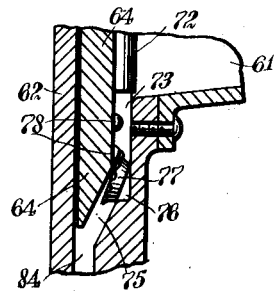
Figure 14:
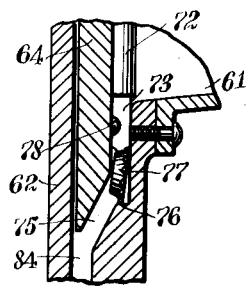
Figure 2A:
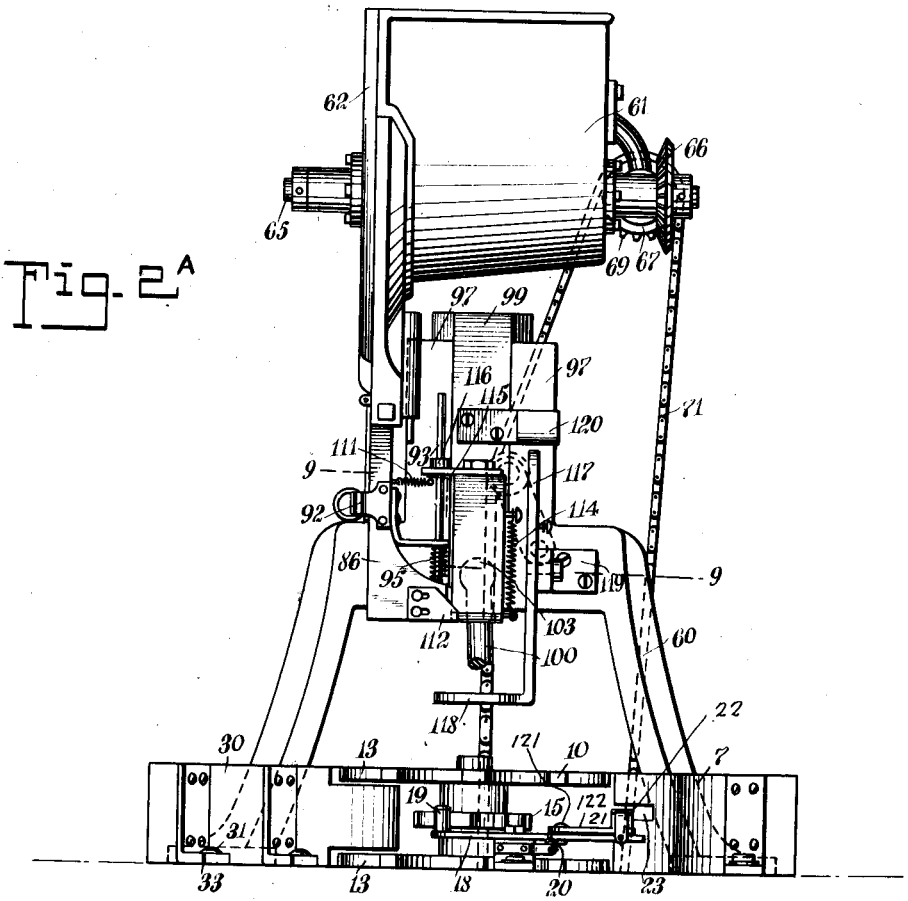
Figure 3:
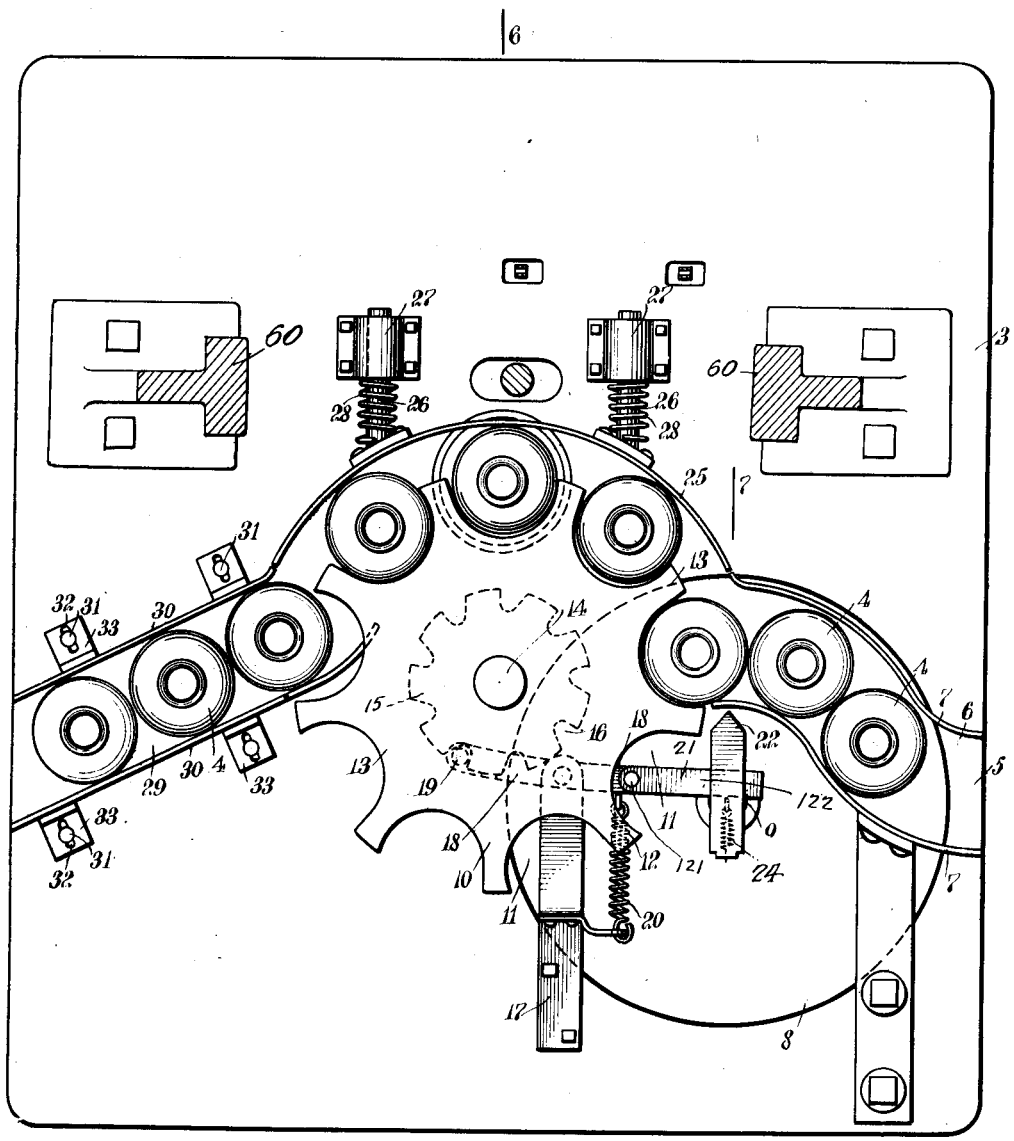
Figure 4:
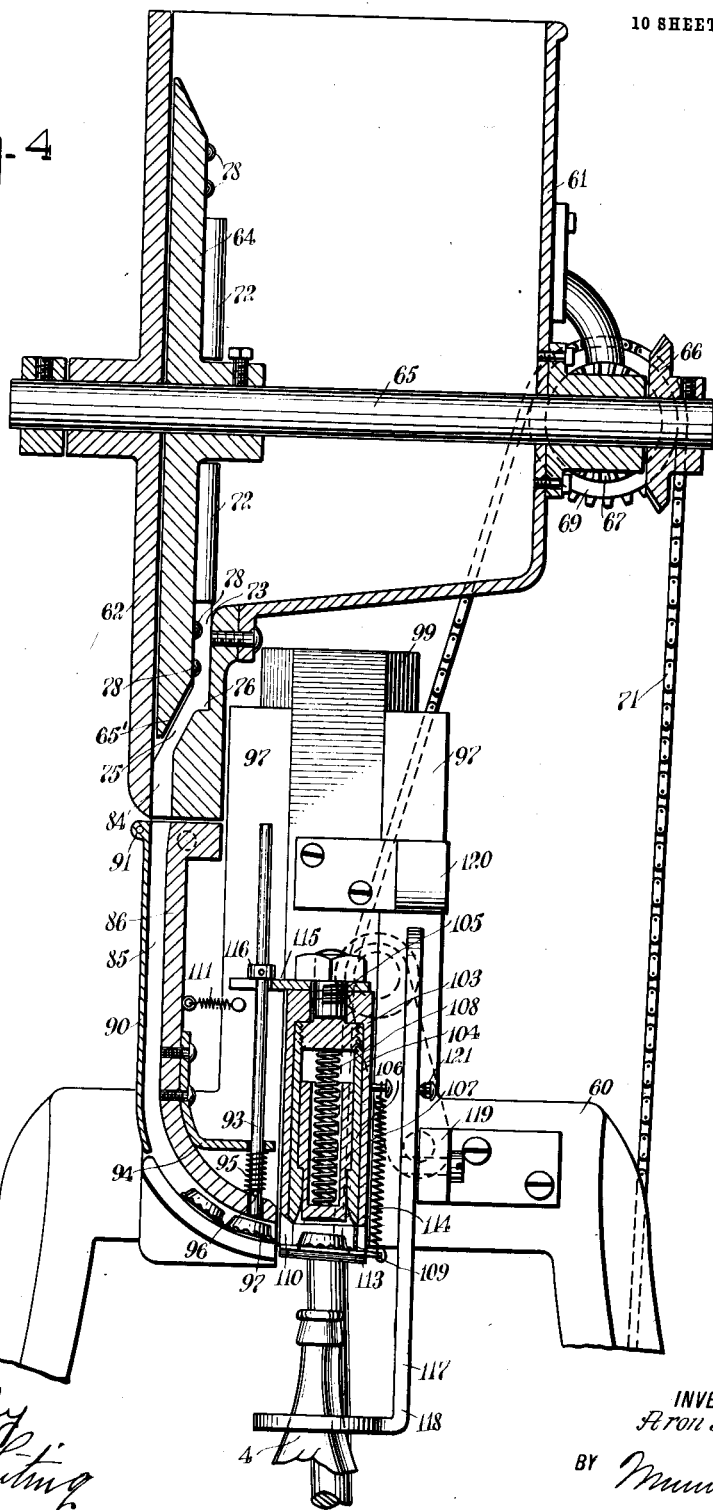
Figure 5:
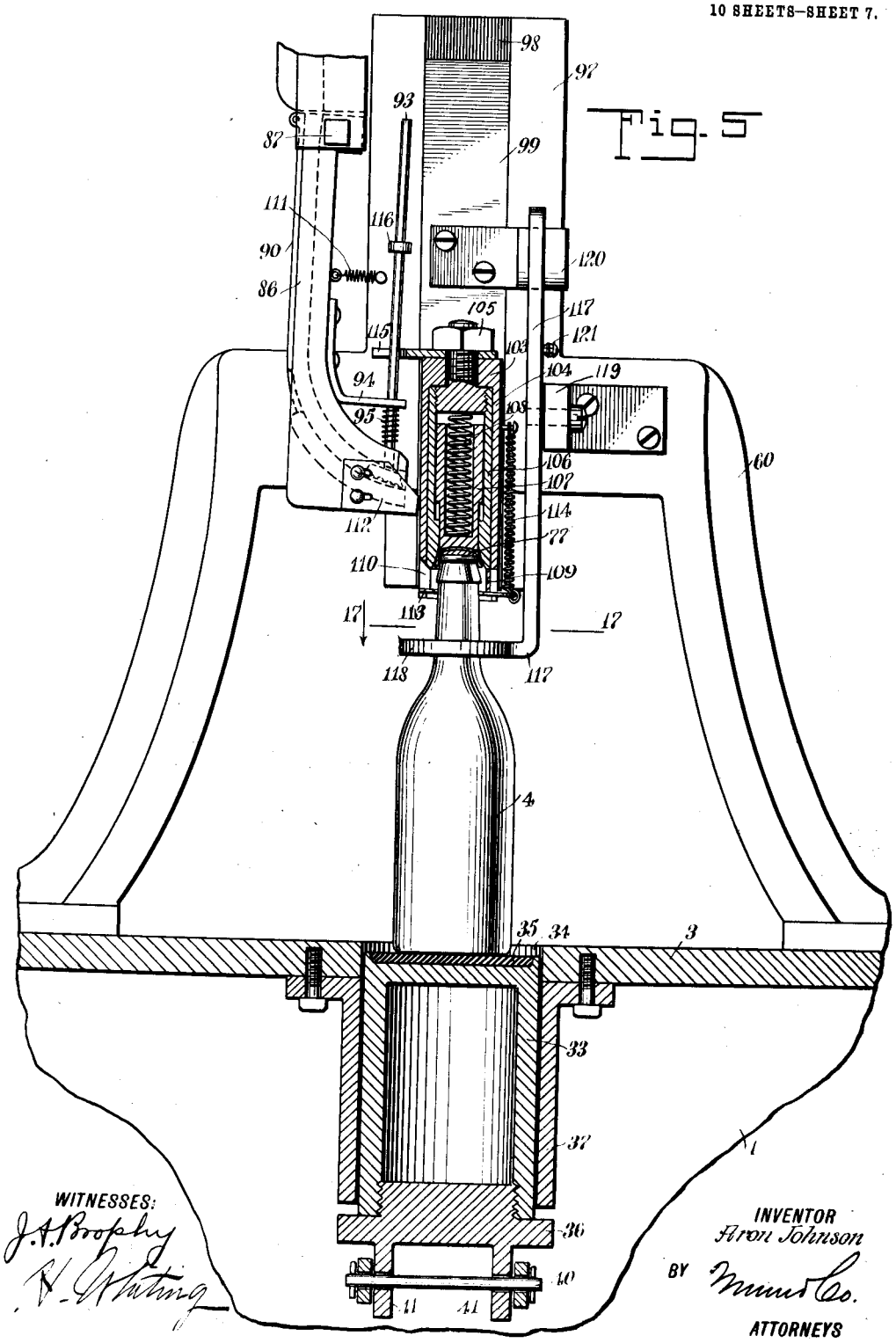
Figure 6:
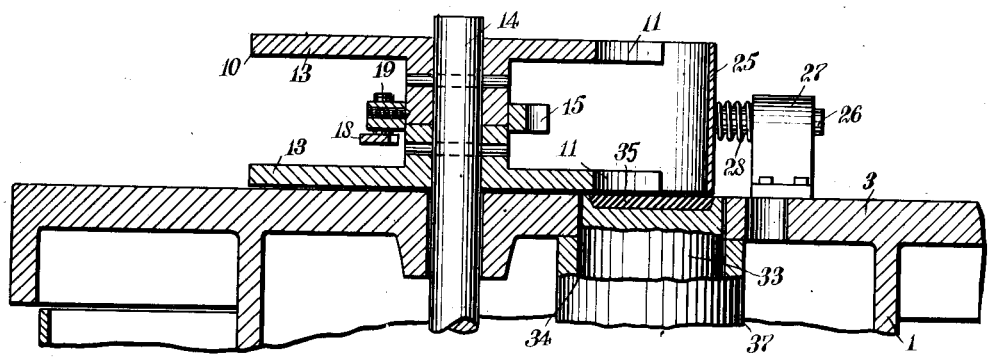
Figure 7:
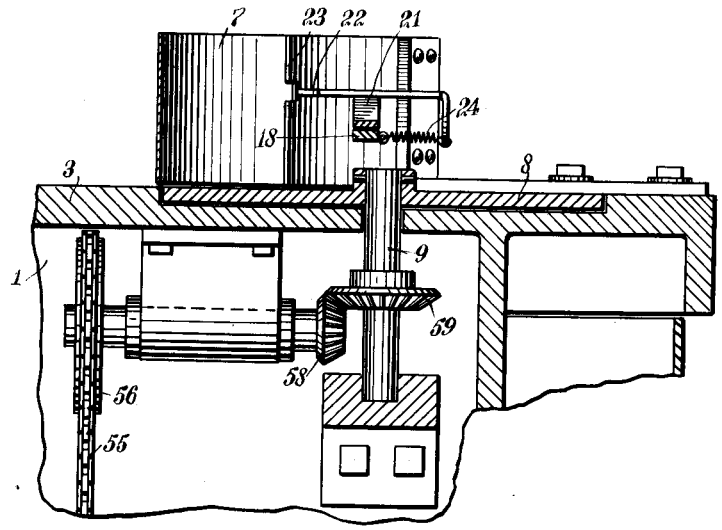

Figures 1 and 1^A, taken together, illustrate a view in elevation of my device, showing in Fig. 1, the side removed to disclose the underlying mechanism: Figs. 2 and 2^A illustrate a view in elevation, taken at right-angles to the view shown in Figs. 1 and 1^A, the portion illustrated in Fig. 2 being taken in section on the line 2—2 of Fig. 1; Fig. 3 is a top plan view, with parts broken away to show the underlying structure; Fig. 4 is an enlarged vertical section through the cap hopper and capping mechanism, illustrating the plunger in its raised position, out of contact with the bottle; Fig. 5 is an enlarged fragmentary view in elevation, partly in section, showing the plunger in contact with the bottle in the act of crimping the cap onto the bottle; Fig. 6 is an enlarged vertical fragmentary section on the line 6—6 of Fig. 3; Fig. 7 is an enlarged vertical section on the line 7—7 of Fig. 3; Fig. 8 is a side view in elevation, of the cap hopper with the side plate removed, showing the passages and channels in the hopper through which the caps travel; Fig. 9 is a horizontal section on the line 9—9 of Fig. 2^A, showing the structure of the plunger; Fig. 10 is a bottom plan view of the plunger, illustrating the doors for holding the cap in position before being secured to the bottle; Fig. 11 is a side view in elevation of the feeding disk; Fig. 12 is an enlarged vertical section on the line 12—12 of Fig. 11; Fig. 13 is an enlarged vertical section through the lower portion of the feeding disk and the channels juxtaposed thereto, illustrating a cap passing through in the correct position; Fig. 14 is a view similar to Fig. 13, illustrating a cap attempting to pass through in the incorrect position and being stopped by the abutment juxtaposed to the passage; Fig. 15 is a fragmentary plan view similar to Fig. 3, showing the controlling mechanism interfering with the progress of a bottle which is attempting to enter the bottle-feeder at an inopportune moment; Fig. 16 is a bottom plan view of the gear member which is intermittently driven by the cam for the purpose of feeding the bottles intermittently; Fig. 17 is a horizontal section on the line 17—17 of Fig. 5, showing the clamping members engaging the bottle; Fig. 18 is an enlarged fragmentary view in elevation illustrating the connection of the cap-supporting doors, and showing in dotted line the positioner attached to the lower end of the plunger; and Fig. 19 is a perspective view of the positioner shown in Fig. 18, illustrating the open side thereof which permits the caps to be fed therein. Fig. 20 is a perspective view of the pivoted lever and movable lock bar carried thereby, shown in plan view in Fig. 15.

Referring more specifically to the separate parts of the device, 1 indicates a framework, which may be of any suitable form and material, but is preferably in the form of a casing adapted to inclose and protect the operating mechanism. Access may be had to the interior of the casing 1 by means of doors 2 pivotally secured to the casing 1 in any well known manner. The top of the frame 1 is in the form of a table 3, on which the bottles, indicated at 4, which are to be capped, are manipulated. The bottles 4 are fed in any suitable manner, as by hand or by another machine (not shown) to the top of the table 3 at a point indicated at 5 in Fig. 3, where they are confined in a passageway 6 formed between upwardly-extending strips 7 which are secured to the table 3 in any well known manner. The strips 7 forming the passageway 6 extend over a turn-table or disk 8, the upper surface of which preferably extends flush with the top of the table 3, and for this purpose the turn-table itself is inset in a cavity formed in the top of the table 3. The disk or turn-table 8 is secured to a shaft 9 in any well known manner, the latter being journaled in the frame 1 and driven in a manner to be described hereinafter, so as to rotate the turn-table 8 in a left-handed direction, looking down thereon in the view illustrated in Fig. 3. It will thus be seen that the bottles 4 are fed toward the left in Fig. 3, until they come in contact with a feed wheel 10, which is in the form of a plurality of superposed star wheels 13 having cavities 11 therein of sufficient size to accommodate a single bottle 4. It is to be noted that the teeth of the feed wheel 10 which form the dividing partitions between the cavities 11 slope away at one side, considering the direction of their travel, and concave inwardly on the other side. This is for the purpose of permitting the bottles 4 to readily enter the cavities 11 and to be positively engaged by the teeth 12 coming thereafter, so that the bottles may be positively fed around in a left-handed direction. As stated above, the feed wheel 10 is composed of a plurality of superposed star wheels 13, the cavities and teeth of which register in vertical lines. These star wheels 13 are secured in any well known manner to a shaft 14 which is driven in a left-handed direction in a manner to be described hereinafter.

Intermediate the star wheels 13 and secured thereto so as to form a rigid part of the feed wheel 10, there is provided a cam wheel 15, which has sockets 16, the number of which correspond to the number of cavities in the feed wheel 10. While the number of the cavities in the feed wheel 10 may be as many as desired, nine are shown, so that for one complete rotation of the feed wheel 10, nine bottles will have been fed thereby. The purpose of the cam wheel 15 is to control, through mechanism which will be now described, the admission of the bottles to the feed wheel 10, so that the bottles will not be fed thereto at an inopportune moment.

Secured in any well known manner to the frame 1, there is provided a bracket 17, to which is pivotally secured in any well known manner a lever 18. The lever 18 is provided at one end with a follower 19 in the nature of a roller adapted to engage the cam wheel 15. This follower 19 is normally held in engagement with the cam wheel 15 by means of a spring 20, which is secured to the lever 18 at one end, and to the bracket 17 at its opposite end. Pivotally secured to the lever 18 at the point 121 in any well known manner so as to have a limited motion, there is provided a latch member 21, which comprises an arm 122 normally extending in alinement with the lever 18, and a bar 22 extending transversely of the arm 122 and rigidly secured thereto, said bar 22 having a double bevel at one end to form a point. This pointed locking bar 22 is adapted to project through a slot 23 in one of the strips 7, so as to form an obstruction in the passage 6 when the cam follower 19 is raised from the sockets 16 and is bearing on the outer periphery of the cam wheel 15. The sockets 16 are so positioned with respect to the cavities 11 that the cam follower 19 will be out of these sockets at all points other than where a cavity 11 extends in proper juxtaposition to the end of the passage 6; that is, in a position ready to receive one of the bottles 4. It will thus be seen that the bar 22 will be projected across the passage 6 at all times other than when the cavity 11 is placed in proper receiving relation with respect to the cavity 6. In order that the latch member 21 may not damage itself or one of the bottles in case it should be forced directly against the bottle as by reason of irregularities in the size of the bottles, the bar 22 and arm 122 are yieldingly held to the lever 18 by means of a spring 24 having its ends secured to the lever and the bar respectively.

For the purpose of holding the bottles 4 in the cavities 11 and thus causing them to be positively fed around by the teeth 12, there is provided a guard 25 in the form of a strip, spaced apart from the feed wheel 10, and arcuate in form, so as to form a circular passage bounded by itself on one side and by the feed wheel 10 on the opposite side. For the purpose of allowing for bottles of different diameters, this guard 25 is yieldingly secured to the table 3 in any suitable manner, as by being secured to rods 26 which are slidingly mounted in brackets 27 on the table 3 and normally urged therefrom by springs 28 coiled on the rods 26 and interposed between the brackets 27 and the guard 25. It will thus be seen that a yielding passage is formed between the feed wheel 10 and the guard 25, which allows for irregularities in the bottles, and yet positively and yieldingly holds the bottles in engagement with the feed wheel 10.

The bottles, after having been capped in a manner to be described, reach the end of the passage formed between the feed wheel 10 and the guard 25, and are delivered by the feed wheel 10 to a passage 29 formed between upwardly-extending strips 30, which are adjustably secured to the table 3 by means of pins or bolts 31 engaging slots 32 in brackets 33, which are secured in any well known manner to the strips 30. The purpose of this adjustable means of securing the strips 30 to the table 3 is to allow the width of the passage 29 to be varied for different sizes of bottles.

As the bottles are fed around by the feed wheel 10, they are each successively brought above a supporting member 33, which extends in juxtaposition to an opening 34 in the table 3. This supporting member 33 may be of any suitable form, but preferably consists of a cylindrical body having a resilient cushion 35 at the top thereof, and removably secured at its bottom to a cap 36. The body of the supporting member 33 extends through a guiding cylindrical casing 37, and the upward motion of the supporting member 33 is limited by the flange on the cap 36 which engages the lower end of the casing 37. The dimensions of the various parts are so arranged that the top of the supporting member 33 will extend flush with the surface of the table 3 when in its uppermost position.

For the purpose of allowing for bottles of different heights when operated on by the cap-affixing mechanism, the supporting member 33 is counterbalanced by a heavy weight 38 which is secured to one end of a lever 39 pivotally secured in any well known manner to the supporting member 33, as by means of a pin 40, which engages brackets 41 on the cap 36. The weight 38 is inclosed in a suitable casing 42, to protect the weight and the operator, and also to form, by the bottom thereof, a suitable support for the weight 38 when the supporting member 33 is in its uppermost position. It will thus be seen that the supporting member 33 is yieldingly held in its uppermost position in such a manner that it will allow for bottles of different lengths, without any danger of disarranging the operating mechanism or breaking the bottles.

The motion of the feed wheel 10 is intermittent so as to allow the bottle to rest on the support 33 a predetermined interval during which the cap is being affixed to the bottle. For this purpose, the lower end of the shaft 14 is provided with a gear 43 in the form of a pin gear having cam-following pins 44 projecting from the lower surface thereof. These pins 44 are provided with rollers, so that they will anti-frictionally engage the cam flange 45 of a cam gear 46. This cam flange 45 is so designed as to permit the gear 43 to remain stationary during two-thirds of a revolution of the gear 46, so that the shaft 14, and thus the feed wheel 10, will remain stationary during two-thirds of a revolution of the gear 46. The cam gear 46 is secured in any well known manner to a transverse shaft 47, which is journaled in any well known manner in the frame 1, and is provided at one end with a gear 48. The gear 48 (see Fig. 2) meshes with a pinion 49 on a stop shaft 50. The shaft 50 is adapted to be connected into driving relation with any suitable source of motive power, indicated by the belt pulley 51, by means of a clutch 52, which is operated by a suitable lever 53. The shaft 47 also drives the turn-table 8 hereinbefore described. For this purpose it is provided with a sprocket wheel 54, which is connected in driving relation by means of a chain 55, to a sprocket wheel 56 on a shaft 57. The shaft 57 is provided at its opposite end with a bevel pinion 58, which meshes with a bevel gear 59 on the shaft 9 which drives the table 8. Having described the feeding mechanism for advancing the bottles we now come to the mechanism for feeding the caps to be affixed to the bottles.

Extending upwardly from the frame 1, there is provided an auxiliary frame 60, which supports a hopper 61 in which the caps to be affixed to the bottle are stored. The sides and bottom of this hopper 61 are formed continuously and slope toward one end of the hopper. This end toward which the sides and bottom slope is provided with a removable face plate 62, which is removed in Fig. 8 to show the underlying structure of the hopper. It will be seen, by reference to Fig. 8, that the hopper 61 is provided with a circular channel 63, into which the caps are adapted to fall. The greater part of this channel, however, is filled up when the parts are in their proper position, with the face plate 62 in place, by a feed wheel 64 in the form of a rotatable disk having its periphery beveled at 65' to form an inclined peripheral face. The channel 63 is beveled to correspond with the beveled surface of the feed wheel 64. The feed wheel 64 is secured to a shaft 65 in any well known manner, the latter being rotatably supported in the framework of the hopper 61, and provided on its outer end with a bevel gear 66, whereby it is driven. The bevel gear 66 meshes with a corresponding bevel gear 67 on a shaft 68. The shaft 68 is provided with a sprocket 69, which is connected in driving relation with a sprocket 70 on the shaft 47 by means of a drive chain 71.

In order that the feed wheel 64 may stir up the caps in the hopper 61, it is provided with a plurality of ribs or ridges 72 secured to the feed wheel 64 in any well known manner, as by being formed integral therewith. These ridges 72 do not extend the full radial distance of the feed wheel 64, but terminate at a point approaching the distance of the bottom of the hopper from the shaft 65, so that the end faces of the ridges extend in a line with the bottom of the hopper when they are in their lowermost position.

It will be seen by reference to Fig. 4 that there is provided between the feed wheel 64 and the portion of the hopper extending below the bottom thereof, a passageway 73, which will be seen by reference to Fig. 8 to be circular, and comprising the portion of the channel 63 unoccupied by the feed wheel 64. This passage 73 is just sufficiently wide to permit the caps of a certain thickness to fall therein edgewise, so as to pass through the passage in an erect position.

Centrally located at the bottom of the circular passage 73, there is provided an outlet passage 75, which slopes downwardly at an angle corresponding to the bevel of the feed wheel 64, and spaced apart from said beveled face of the feed-wheel a distance sufficient to allow a cap to pass through when traveling edgewise.

It will be noted by reference to Figs. 4, 13 and 14 that the point where the passage 75 joins the circular passage 73 extends downwardly to form an abrupt corner or angle 76. It is this corner or angle which forms the obstruction beyond which a cap entering the passage 73 in the wrong direction, cannot travel. By particular reference to Figs. 13 and 14, there will be seen respectively the right and wrong positions of the caps, indicated at 77, in passing through the channel 73. In the position indicated in Fig. 13, the top of the cap 77 is shown adjacent the hopper body, and the under side of the cap is shown as contacting with the feed wheel 64. The dimensions of the parts at this point are such that the cap positioned in the passage 73, as indicated in Fig. 13, will slide down into the passage 75 by reason of the small size of the top, which permits the cap to slip by the corner 76 formed between the bottom of the passage 73 and the passage 75. On the other hand, a cap which has dropped into the slot 73 in the position indicated in Fig. 14, because of the larger diameter of the under side of the cap in its non-contracted condition, is prevented from falling off the bottom ledge of the passage 73 by abutting against the shoulder formed by a beveled portion of the feed wheel 64, and thus cannot get by the obstructing corner 76. When a cap has fallen into the passage 73 in the position indicated in Fig. 14, it is necessary to remove it from juxtaposition to the passage 75, so that properly positioned caps may fall into the passage 75 and proceed down to the affixing mechanism, to be described. For this purpose, the inner face of the disk feed wheel 64 is provided with a plurality of knobs or buttons 78, set therein at suitable intervals and so located on the feed wheel 64 that they will travel through the circular passage 73. These knobs 78 are yieldingly held in extended position by means of springs 79, as will be seen by reference to Fig. 12. The knobs 78 are provided with flanges 80, which engage corresponding flanges 81 projecting inwardly from bores 82 provided in the feed wheel 64. The backs of the bores 82 are closed by suitable caps 83 which form bearing plates for the springs 79. It will thus be seen that, as the disk rotates, any caps which are not properly positioned in the circular passage 73 will be yieldingly engaged by the knobs 78 and carried up to the end of the passage and returned to the interior of the hopper 61. The caps 77 which enter the passage 75 in the proper position fall into a vertically-extending passage 84. Extending below the passage 84, there is provided a feeding passage 85 in a feeder 86 shown in the form of a chute. This feeder 86 is pivotally secured to the body of the hopper 61, so that it can swing back and forth, for a purpose to be described.

The means for pivoting the feeder 86 to the hopper 61 is more clearly shown in Figs. 8 and 1ᴬ, and consists of a pair of screws 87 adjustably secured in screw-threaded openings in lugs 88, and engaging the feeder 86 from opposite sides. This manner of pivotal support permits the accurate adjusting of the feeder 86 with respect to the passage 84, and also with respect to the cap-affixing mechanism. The screws 87 may be locked in any adjusted position by locking nuts 89. The front side of the feeder 86 is in the nature of a door 90, pivotally hinged to the body of the feeder at 91, and adapted to swing outwardly, so that access may be had to the interior of the passage 85 in case the same should be obstructed. This door 90 is held in its closed position, as will be seen by reference to Figs. 9 and 9ᴬ, by means of snap-spring locks 92, which are secured to the body of the feeder 86 and adapted to engage the door on either side.

Juxtaposed to the outlet of the feeder 86, there is provided an opening in the upper surface thereof, through which extends a stop 93 in the form of a rod, which is normally urged into engagement with the lowermost cap in the feeder 86, and is adapted to prevent the out-going of the cap until released by the cap-affixing mechanism. The rod 93 is slidingly-supported in an opening in a bracket 94 secured on the feeder 86 in any well known manner, and is further normally urged into engagement with the lowermost cap by means of a spring 95 which engages the bracket 94 at one end, and a pin 96 on the rod 93, at the other end. Having described the cap-feeding mechanism, we now come to the cap-affixing mechanism.

Referring more particularly to Figs. 9 and 4, it will be seen that there are provided on the frame 60, which forms an extension of the frame 1, guides 97, which are provided with vertically-extending guiding channels or ways 98, in which is slidingly mounted a carriage 99. This carriage 99 is adapted to reciprocate vertically in the ways 98, and for this purpose, has pivotally connected thereto in any well known manner, a rod 100, which is reciprocated by an eccentric 101 on the shaft 47. The rod 100 is provided with a suitable turn-buckle 102, whereby its length may be adjusted whereby the position of the carriage 99 in the ways 98 may be adjusted. Secured to the carriage 99 in any well known manner, there is provided a plunger 103, which reciprocates with the carriage, and is adapted to affix the caps to the bottles. The plunger consists of a hollow casing 104, in which is removably secured by means of a fastening member 105 a hollow tubular former 106. This former 106 flares downwardly and outwardly on the inner side of its lower end, so as to gradually contract or crimp the sides of a cap as it travels down on the same. Within the former 106, there is provided a cushion 107, which is normally yieldingly held in its lowermost position by means of a spring 108. The cushion 107 and the former 106 are provided with co-acting shoulders which limit the downward motion of the cushion relative to the former. Disposed below the former 106 and the cushion 107, there is provided a positioner 109, in the form of a collar open at one side and secured in any well know manner to the casing 104. The form of this collar is more clearly illustrated in Fig. 19, and its position with respect to the other members shown in dotted lines in Fig. 18, and in full lines in Fig. 4.

The open side of the positioner 109, which is adapted to receive the caps and place them in proper position with respect to the cushion 107 and the former 106, is so located that it extends toward the outlet of the feeder 86. The outlet of this feeder 86 is normally held in juxtaposition to the open side of the positioner 109 and an opening 110 in the casing 104, by means of a spring 111. In order to accurately position the outlet of the feeder 86 with respect to the opening 110 and the positioner 109, there is provided on the side of the feeder 86 a beveled plate 112, which is adapted to engage the opening 110 in the casing 104 when the plunger is so located that the opening 110 is opposite the outlet of the feeder 86.

In order that a cap may be held by the plunger 103, there is provided on the bottom of the plunger 103, a pair of doors 113, which are hinged to the plunger in such a manner that they will swing downwardly away from each other. These doors 113 have on their facing edges, as will be seen by reference to Fig. 10, circular cut-out portions, so that they form between them a circular opening through which the neck of each bottle is adapted to extend when the plunger passes down during the operation of affixing a cap to a bottle. The doors 113 are normally held up in their closed position by means of springs 114. It will be noted by reference to Fig. 4, that these doors 113 slope from the outlet to the feeder 86 toward the back of the positioner 109, so that when the cap slips into the plunger casing, it will slide toward the right until it reaches the far wall of the positioner 109. In order that the stop 93 may be released when the opening 110 in the plunger 103 is opposite the outlet of the feeder 86, so that a cap will slide into the plunger, there is provided on the plunger a trip 115, which is bifurcated so as to engage the opposite sides of the rod 93, and is adapted to engage a collar 116 secured to the rod 93, so as to lift this rod against the tension of the spring 95.

For the purpose of holding the bottles steady and in proper position with respect to the plunger 103, there is provided on the frame 60 a gripper 117, which comprises a plurality of tongs 118 pivotally connected to a bracket 119 on the frame 60. These tongs 118 extend at their upper ends beyond the bracket 119, and diverge slightly from each other, so as to form an entering groove for a cam wedge 120, which is secured to the carriage 99 in any well known manner. The tongs 118 are open pivoted, not cross pivoted, so that the lower ends thereof are normally held apart and open, and the upper ends held together by means of a spring 221, which is secured at its ends in any well known manner to the tongs 118 above their pivot points. It will thus be seen that, as the carriage 99 and the plunger 103 move downwardly, the cam wedge 120 enters between the upper arms of the tongs 118, spreading them apart, and thereby simultaneously forcing the lower ends of the tongs together, causing them to grip the bottle and hold it in position. This cam wedge 120 is provided with wide sides for a considerable portion of its depth so that it will maintain the gripper in gripping contact with the bottle, even when the plunger starts to return, so that the cap affixed to the top of the bottle will force the doors 113 open against the tension of the springs 114, thereby permitting the removal of the bottle from engagement with the plunger.

The operation of the device will be readily understood when taken in connection with the above description.

The bottles to be capped are fed into the passage 6 by hand or by some suitable machine, and are continuously urged toward the feed wheel 10 by means of the constantly rotating turntable 8. When the cavities 11 are in proper juxtaposition to the end of the passageway 6, the bottles are fed therein and carried around by the feed wheel 10. If the feed wheel 10 should not happen to be in proper juxtaposition, the bar 22 of the locking member 21 will be interposed between the feed wheel and the foremost bottle in the passage 6, thereby preventing it from coming in contact with the feed wheel 10 until the proper moment. The feed wheel 10 is actuated intermittently, so as to advance the bottles step by step and permit each bottle to remain on the supporting member 33 during a sufficient time for it to be capped by the cap-affixing mechanism. The cam flange 45 is so constructed and positioned with respect to the position of the eccentric 101 that the bottle will remain stationary on the support 33 during the period in which the plunger is in engagement with the bottle in the act of affixing a cap, and also for a time sufficient to permit the plunger to engage with the bottle and disengage therefrom. The caps stored in the hopper 61 are stirred up by the feeding wheel 64, and those which pass into the passageway 73 in the proper position, as indicated in Fig. 13, are permitted to travel by the beveled edge of the feed wheel 64 and into the feeder 86 disposed below. Those of the caps, however, which enter the passageway 73 in the wrong position, as indicated in Fig. 14, are caught by the yielding knobs 78 and whirled up and around and deposited in the body of the hopper 61 to have another chance of entering the passageway 73 properly. The caps in the feeder 86 are held from coming out at the outlet by the stopping rod 93, which is released by the trip 115 when the mouth or outlet of the feeder 86 is in opposition to the inlet opening 110 in the plunger casing 104. The sloping bottom of the plunger causes the cap admitted thereto to travel to the farther side of the positioner 109, so that it is held in proper position over the central openings in the doors 113, so as to be affixed to a bottle disposed below on the support 33. The bottle is held from movement by means of the grippers 117 which are actuated by the cam wedge 120 when the plunger moves downwardly toward the bottle. During this downward movement, the top of the bottle projects through the registering openings in the doors 113 and enters the lower side of the cap, the latter being crimped or contracted onto the top of the bottle by the former 106, the conical mouth of which passes its decreasing cross section over the cap. The cap is held in proper position on the bottle and prevented from returning with the former by means of the spring-held cushion 107. When the plunger returns upwardly, the bottle is held on the support 33 by the grippers 118, which are not released until the bottle has pulled the cap through the yieldingly closed doors 113. The heavily counterweighted support 33 gives the proper yielding resistance to the bottle when the cap is being affixed by the plunger, and yet permits bottles of different sizes to be capped by the same machine without any other adjustment. The spring 111 which normally holds the feeder in engagement with the plunger when in proper position, permits the feeder to swing away from the plunger during the motion of the latter, so as not to interfere with its operation. The operation is continuous, each part positively and automatically taking care of its particular function without interfering with the functions of the other parts, and yet so timed as to coöperate with the other parts at the proper moment.

While I have shown one embodiment of my invention, I do not wish to be limited to the specific details thereof, but desire to be protected in various changes, modifications and alterations which I may make within the scope of the appended claims.

Having thus described my invention, I claim as new and desire to secure by Letters Patent:—

1. In a bottle capping machine, the combination with a cap affixing mechanism, of a bottle feeding wheel having a plurality of cavities therein, means for feeding bottles to the said wheel, a cam wheel having a plurality of sockets corresponding to said cavities in said feed wheel and a stopping device actuated by the said cam wheel for intermittently obstructing the feeding of the said bottles by the said feeding means to the said feeding wheel.

2. In a bottle capping machine, the combination with a cap affixing mechanism of a continuously driven turntable for feeding bottles, a plurality of strips extending over the said table and forming a passageway, whereby the movement of the bottles is confined, a feed wheel comprising a plurality of superposed star wheels having cavities therein adapted to receive the bottles, means for intermittently driving the said feed wheel, a cam wheel having sockets corresponding to the said cavities in the said feed wheel and connected in driving relation with the said feed wheel, a follower adapted to engage the said cam, a lever operated by the said follower, and a latch resiliently pivoted to the said lever and adapted to prevent the movement of said bottles from said turn-table to said feed wheel.

3. In a bottle capping machine, the combination with a frame of a plunger slidingly mounted in the said frame, inclined bottom doors hinged to the said plunger, springs for holding the said doors closed, the said plunger comprising a casing, former mounted in the casing, a cushion mounted in the former, and a spring for normally holding the said cushion in its lowermost position.

4. In a bottle capping machine, the combination with a cap affixing mechanism of a continuously driven turn-table for feeding bottles, a plurality of strips extending over the said table and forming a passageway confining the movement of said bottles, a feed wheel comprising a plurality of superposed star wheels having cavities therein adapted to receive the said bottles, means for intermittently driving the said wheel, a cam wheel having sockets therein coresponding to the said cavities in the said feed wheel and connected in driving relation to the said feed wheel, and a stop adapted to be intermittently projected across said passageway by the said cam wheel to prevent the movement of said bottles from said turn-table to said feed wheel.

5. In a bottle capping machine, the combination with a cap-affixing mechanism, of a cap-feeder, a rod adapted to project into said feeder to prevent the passage of said caps from said feeder to said cap-affixing mechanism, a spring for normally urging said rod into said feeder, and a trip connected to and operated by said cap-affixing mechanism, adapted to remove said rod from projection into said feeder against the tension of said spring.

6. In a bottle capping machine, the combination with a cap-affixing plunger, of a cap-feeder, a vertically-extending rod adapted to project into said feeder to prevent the passage of caps from said cap-feeder to said cap-affixing plunger, a collar on said rod, and a trip slidingly engaging said rod, mounted on said plunger and adapted to be operated by said plunger so as to engage said collar and withdraw said rod from its stopping position with respect to said feeder.

7. In a bottle capping machine, the combination with a plunger having an opening in the side thereof, of a cap hopper, a feeder for carrying caps from said hopper to said plunger, said plunger being movable relative to said feeder, so that the opening in the side thereof is at times out of alinement with the delivering end of said feeder, and means for bringing said delivering end of said feeder into alinement with said opening, said plunger having an inclined bottom comprising a plurality of doors hinged so as to swing outwardly under an excessive pull thereon.

8. A feeding mechanism, comprising relatively movable members coacting to deliver an article to be fed, means coacting with one of the members for controlling the direction of travel of the article, and a mechanism capable of operation to obstruct the travel of the article toward the second member, said mechanism including a part capable of movement to contact with such article, a movable member, a yieldable connection between the movable member and the part, and means for imparting movement to the movable member, whereby the part is caused to operate.

9. A feeding mechanism, comprising two rotatable members coacting to deliver an article to be fed, means coacting with one of the members for interrupting the travel of the article, and means rotatable about an axis common to the rotative axis of the other member for controlling the operation of such interrupting means.

10. In a device of the character specified, a transferring mechanism for articles comprising a disk arranged to rotate in a horizontal plane and having peripheral recesses for receiving the articles, means for continuously moving the articles toward the disk, a bar pivoted adjacent to the disk and having one of its ends in position to engage and hold an article on the moving means when the said bar is swung toward the article, yielding means normally pressing the bar into inoperative position, and means operated by the transferring disk for moving the bar into operative position at regular intervals to properly space the articles.

11. In a device of the character specified, a transferring mechanism for articles comprising a disk arranged to rotate in a horizontal plane and having peripheral recesses for receiving the articles, means for continuously moving the articles toward the disk, a bar pivoted adjacent to the disk and having one of its ends in position to engage and hold an article on the moving means when the said bar is swung toward the article, and means on the disk for swinging the bar at regular intervals.

In testimony whereof I have signed my name to this specification in the presence of two subscribing witnesses.

ARON JOHNSON.

Witnesses:
CHAS. W. SMITH,
CHARLES MOLANDER.